(12) United States Patent
Inatomi et al.

(10) Patent No.: US 8,462,910 B2
(45) Date of Patent: Jun. 11, 2013

(54) NEUTRON SHIELD

(75) Inventors: Takanari Inatomi, Kawasaki (JP);
Toshiyuki Suzuki, Tokyo (JP); Hiroshi Nakamura, Hadano (JP); Toshiro Sakai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 719 days.

(21) Appl. No.: 12/501,683

(22) Filed: Jul. 13, 2009

(65) Prior Publication Data

US 2010/0008463 A1     Jan. 14, 2010

(30) Foreign Application Priority Data

Jul. 14, 2008  (JP) ................................ 2008-182702

(51) Int. Cl.
*G21C 9/00* (2006.01)
*G21C 7/00* (2006.01)

(52) U.S. Cl.
USPC ........... 376/287; 376/277; 376/288; 376/327; 376/339

(58) Field of Classification Search
USPC .......................... 376/287, 277, 288, 327, 339
See application file for complete search history.

(56) References Cited

U.S. PATENT DOCUMENTS

| 2,796,529 | A  | * | 6/1957  | Morrison ................... 250/518.1 |
| 3,868,302 | A  | * | 2/1975  | Singleton ...................... 376/289 |
| 4,299,658 | A  | * | 11/1981 | Meuschke et al. .......... 250/506.1 |
| 5,700,962 | A  | * | 12/1997 | Carden ............................ 75/236 |
| 6,697,450 | B2 | * | 2/2004  | Vaidyanathan et al. ....... 376/418 |
| 2005/0157833 | A1 | * | 7/2005 | Ishihara et al. ............... 376/272 |

FOREIGN PATENT DOCUMENTS

| JP | 35-21800 U | 9/1960 |
| JP | 2-236497 | 9/1990 |
| JP | 9-311192 | 12/1997 |
| JP | 2000-46979 | 2/2000 |

OTHER PUBLICATIONS

Office Action issued Aug. 23, 2011 in Japanese Patent Application No. 2008-182702.

* cited by examiner

*Primary Examiner* — Jack W Keith
*Assistant Examiner* — Frank J. McGue
(74) *Attorney, Agent, or Firm* — Oblon, Spivak, McClelland, Maier & Neustadt, L.L.P.

(57) ABSTRACT

A neutron reactor includes a neutron shield which is disposed outside a nuclear reactor core and adapted to absorb neutrons leaking from the core. The neutron shield includes a plurality of containers each of which contains a powdered neutron absorbing material and which are stacked with one another in a vertical direction, and a cladding tube which houses the containers. The neutron absorbing material is composed of $B_4C$ powder.

3 Claims, 5 Drawing Sheets

NEUTRON SHIELD

BACKGROUND OF THE INVENTION

1. Field of the Invention

The present invention relates to a shielding technique of neutrons in a reactor core, and particularly, to a neutron shield for absorbing neutrons leaking from a nuclear reactor core at an outside of the core.

2. Description of the Related Art

Conventionally, there are proposed technologies utilizing powder of a neutron absorbing material such as $B_4C$ for the use of a control rod (for example, Patent Document 1: Japanese Patent Laid-Open Publication No. 10-39072). However, as a neutron shield structure disposed outside a nuclear reactor core for absorbing neutrons leaking from the core, pellets formed by baking a neutron absorbing material such as $B_4C$ are used. However, it has not known up to the present that a powdered neutron absorbing material has been used for the neutron shield.

A neutron shield is disposed outside the core of a nuclear reactor in a close packed manner so as to cover an outer periphery of the nuclear reactor core and performs a function to protect a nuclear reactor vessel from fast neutrons having high energy. However, unlike the situation for control rods, such a neutron shield is regarded as an internal structure of the reactor and is neither repaired nor replaced for a predetermined period of time, thus requiring a long-term soundness.

However, for such conventional technology, when a pellet-type material is used as the neutron absorbing material, thermal expansion and swelling of the pellets due to neutron irradiation causes a structural degradation of the neutron shield, which makes it difficult to maintain the soundness of the neutron shield until the time of repair or replacement. For example, there is a risk that the pellets are crushed due to thermal expansion and swelling, and hence, damages of the neutron shield or other internal structures of the reactor are caused. In addition, it is not negligible that when the neutron absorbing material is formed into pellets, a baking process of the neutron absorbing material is required, which leads to a high manufacturing cost.

SUMMARY OF THE INVENTION

The present invention was conceived in consideration of the circumstances encountered in the prior art mentioned above and an object thereof is to provide a neutron shield to be disposed outside a nuclear reactor core and excellent in structural soundness.

These and other objects can be achieved according to the present invention by providing, in one aspect, a neutron shield which is disposed outside a core of a nuclear reactor and adapted to absorb neutrons leaking from the core, the neutron shield comprising:

a plurality of containers each of which contains a powdered neutron absorbing material and which are stacked with one another in a vertical direction; and a cladding tube which houses the containers.

In this aspect, it may be desired that each of the containers contains the powdered neutron absorbing material while keeping a space left in an upper portion of an inside of the container in the stacked state thereof.

It may be desired that a clearance is formed in a mating surface between the container and the cladding tube with the container being housed in the cladding tube.

The container may be configured so as to enclose a filling region of the neutron absorbing material with a clearance so as not to be tightly closed.

The neutron shield may further include an upper chamber which is provided in an upper portion of an interior of the cladding tube and into which gas generated by a neutron absorbing reaction of the neutron absorbing material and having leaked to the outside of the container is guided, and also include a support mechanism provided in the upper chamber for pressing an uppermost container in the stacking direction to thereby support the respective containers, the support mechanism being adapted to permit a deformation caused by thermal expansion or swelling of the container.

It may be desired that each of the containers includes a shroud tube for containing the neutron absorbing material, a cover plate for closing an upper opening of the shroud tube, and a bottom plate for closing a lower opening of the shroud tube, the cover plate of the container being provided with a depression which is partly recessed in the neutron absorbing material contained in the container, and the bottom plate of the container being fitted to the depression of the cover plate.

The neutron absorbing material may be composed of $B_4C$ powder.

The neutron shield of the present invention of the structures mentioned above is excellent in structural soundness of the neutron absorbing material.

The nature and further characteristic features will be made clearer from the following descriptions made with reference to the embodiments represented by the accompanying drawings.

DESCRIPTION OF THE PREFERRED EMBODIMENTS

Preferred embodiments of the present invention will be described hereunder with reference to the accompanying drawings. Further, it is to be noted that terms "upper", "lower", "right", "left" and like terms are used herein with reference to the illustration of the drawings or in an actual usable state of the nuclear reactor core.

First Embodiment

Figure 1:
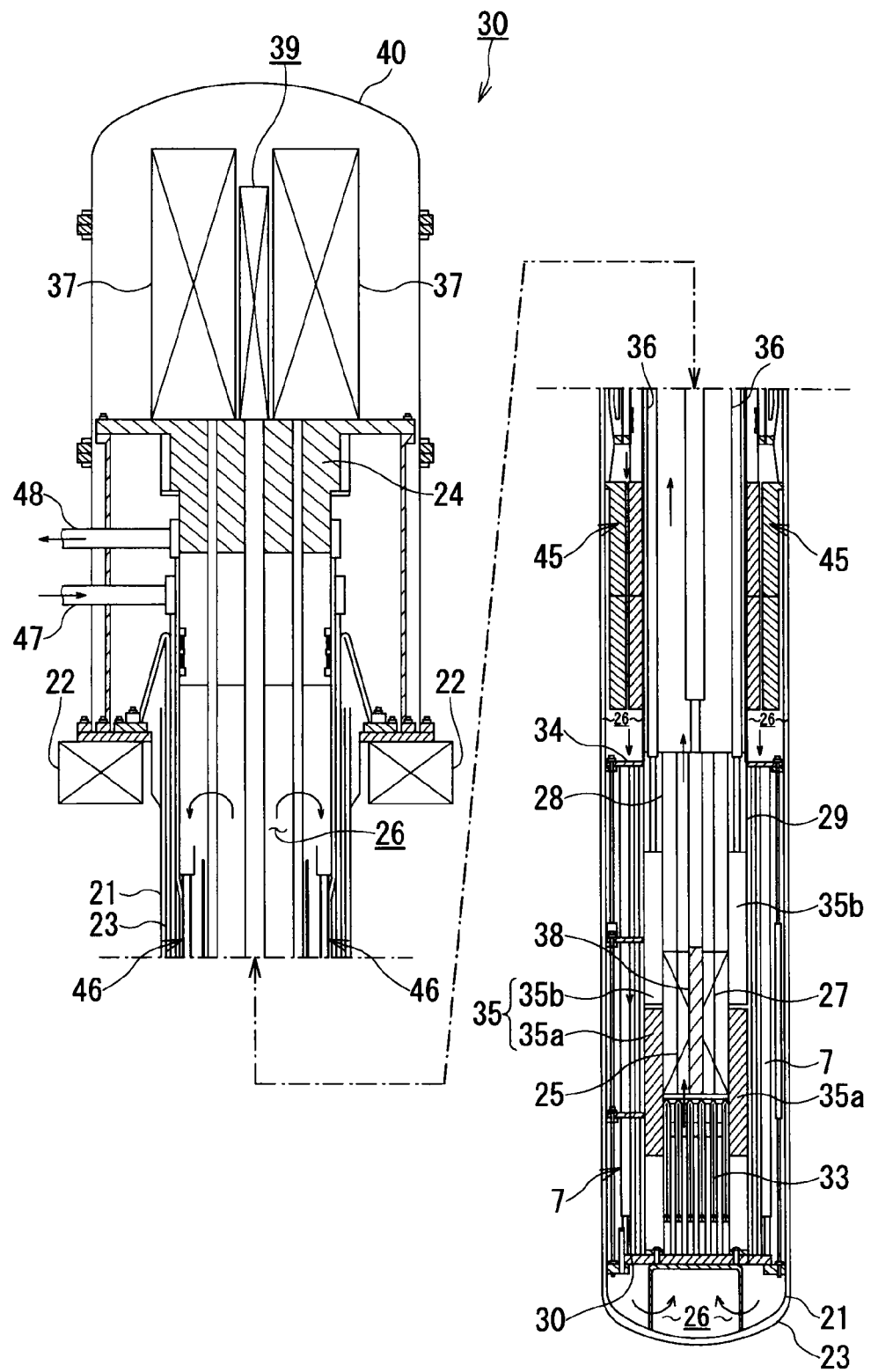
FIG. 1 is an illustrated elevational section representing a nuclear reactor including a neutron shield according to a first embodiment of the present invention.

FIG. 1 illustrates a nuclear reactor provided with neutron shield according to a first embodiment of the present invention.

With reference to FIG. 1, a neutron shield of the present embodiment is provided in a nuclear reactor 20. The nuclear reactor 20 is a fast reactor which utilizes high-speed neutrons generated in association with a nuclear fission without decelerating. A fast reactor is a type of nuclear reactor which can be operated continuously for ten-odd to several tens of years, for example, continuously for about 30 years without replacing the nuclear fuel, and the reactor power of which is 30 MW to hundred-odd MW (ten thousand KW to one hundred and several tens thousand KW, in electric power).

As a coolant, liquid sodium is used, and a temperature used for the coolant is higher than a temperature at which liquid sodium solidifies, and a temperature of 300 to 400 degrees in the coolant flow channel, and 500 to 550 degrees at the core side are used with some margin in a nuclear reactor vessel (reactor vessel RV).

In the nuclear reactor 20, a bottomed cylindrical nuclear vessel 21 is protected by being covered with a gird vessel 23 supported by a pedestal 22. The top of the nuclear reactor vessel 21 is closed with a shield plug 24 constituting an upper plug.

The nuclear reactor vessel 21 contains a core 25, and the inside of the nuclear reactor vessel 21 is filled with liquid sodium as the primary coolant 26. The core 25 is loaded with a fuel assembly 27 of nuclear fuel and is configured so as to provide an entirely cylindrical shape. The core 25 is protected by being surrounded with a core barrel 28.

A cylindrical partition wall 29 is provided outside the core barrel 28 with a space, and the partition wall 29 is supported along with the core 25 and the core barrel 28 on a core support plate 30. The core support plate 30 is supported on a core support which is provided to the lower portion of the circumferential wall of the nuclear reactor vessel 21. The core 25 is provided, to the lower portion thereof, with an entrance module 33, and the upper portion of a fuel assembly 27 to be loaded in the core 25 is supported by an upper support plate 34.

Further, a generally sleeve-shaped (cylindrical or annular) reflector 35 is formed between the core barrel 28 and the partition wall 29. The reflector 35 is linked to a reflector driving mechanism 37 via a driving shaft 36. The reflector driving mechanism 37 is placed on the upper plug forming a shield plug 24, and the reflector 35 moves vertically around the core 25 by being driven by the reflector driving mechanism 37 thereby controlling the reactivity of the core 25.

Further, a reactor shutdown rod 38 is disposed at the central portion of the core 25 so as to be loaded into or unloaded from the core through the driving by a reactor-shutdown-rod driving mechanism 39. The reactor-shutdown-rod driving mechanism 39 is also placed on the upper plug along with the reflector driving mechanism 37. The reflector driving mechanism 37 and the reactor-shutdown-rod driving mechanism 39 are housed and protected in a housing (containment) dome 40.

On the other hand, the outside of the partition wall 29 forms a flow channel of a primary coolant 26 between the partition wall 29 and the nuclear reactor vessel 21, and a neutron shield 7 is arranged in the flow channel. The neutron shield 7 is placed on the core support plate 30, and the upper portion of the neutron shield 7 is supported by the upper support plate 34. The neutron shield 7 shields the neutrons which pass through or circumvent the reflector 35 and are radiated from the core 25.

It is noted that the neutron shield 7 is supported only in the horizontal direction by the core support plate 30 and the upper support plate 34, and is not supported in the vertical direction so as to be freely slidable by thermal expansion.

In the nuclear reactor vessel 21, an annular-shaped electromagnetic pump 45 is disposed above the neutron shield 7, and above the electromagnetic pump 45, an intermediate heat exchanger 46 is placed. The electromagnetic pump 45 and the intermediate heat exchanger 46 are formed, for example, as an integral structure or in an integral manner. The electromagnetic pump 45 circulates the primary coolant 26 in the nuclear reactor vessel 21 as shown in solid arrows, to cause it to flow from upward to downward in the coolant flow channel. Further, the primary coolant 26 and secondary coolant are guided to the tube side and the shell side of an intermediate heat exchanger 46, respectively, in a heat-exchangeable manner. The secondary coolant enters from an inlet nozzle 47 toward the intermediate heat exchanger 46 and exchanges heat with the primary coolant 26 at the intermediate heat exchanger 46 to thereby increase the temperature thereof. Thereafter, the primary coolant is fed from an outlet nozzle 48 to a vapor generator outside the nuclear reactor vessel 21, which is not shown. The secondary coolant is also made up of liquid sodium as the primary coolant is.

Figure 2:
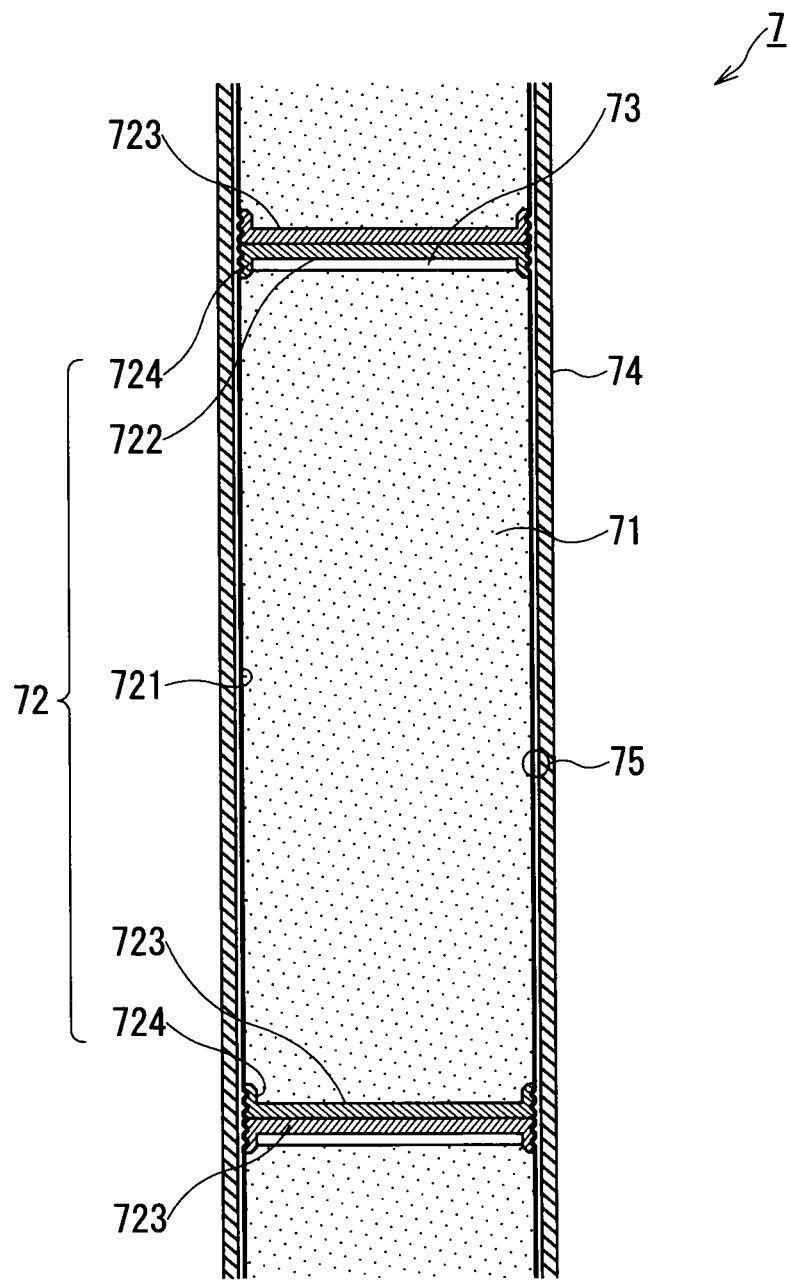
FIG. 2 is an enlarged sectional view of an essential portion of the neutron shield.
Figure 3:
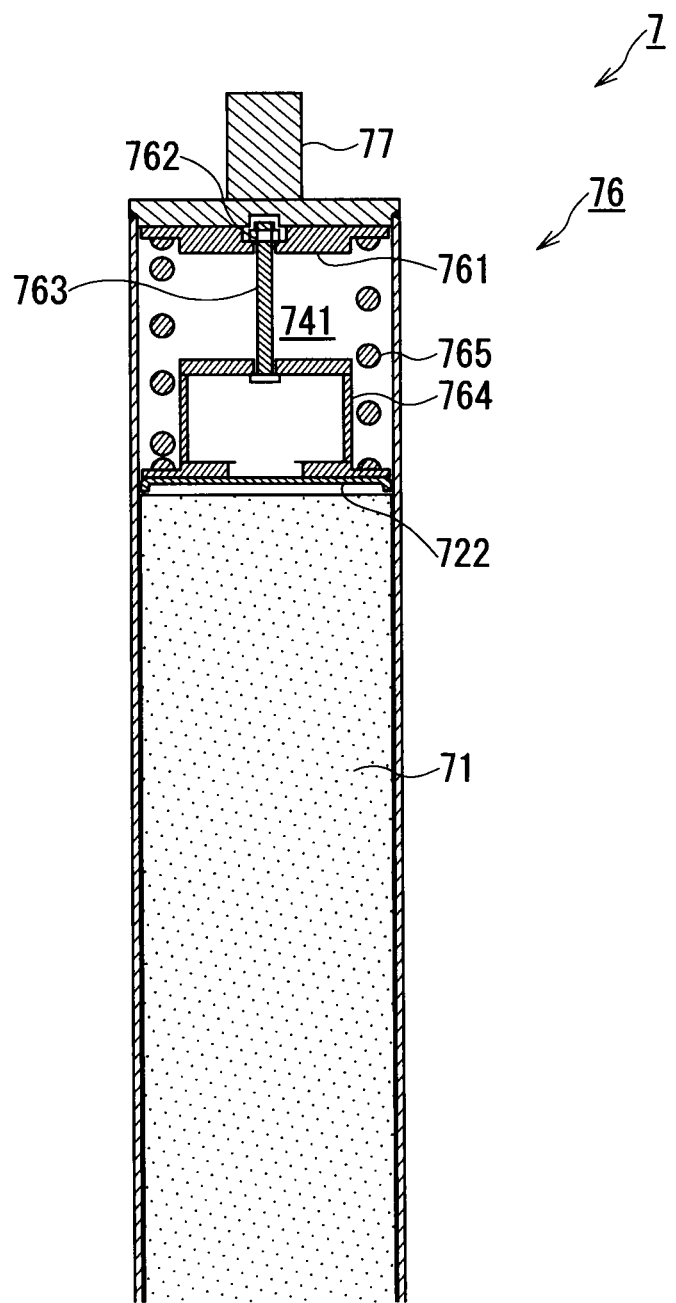
FIG. 3 shows a sectional view of a support mechanism of a container provided in the neutron shield.

FIG. 2 is an enlarged sectional view of an essential portion of the neutron shield 7, and FIG. 3 shows a support mechanism of a container 72 provided in the neutron shield 7, in which reference numeral 77 denotes an upper end plug of a cladding tube 74, which is inserted into a hole, not shown, formed in the upper support plate 34.

As shown in FIGS. 2 and 3, the neutron shield 7 is disposed outside the nuclear reactor core for absorbing fast neutrons leaking from the core. The neutron shield 7 includes a neutron absorbing material 71, a container 72, a space 73, a cladding tube 74, a clearance 75, and a support mechanism 76.

The neutron absorbing material 71 is made up of a powder of $B_4C$ (boron carbide), and is vibration-compacted in the container 72.

The container 72 is provided in multiple numbers, and each container 72 contains a powder of $B_4C$. This container 72 is configured to include a shroud tube 721, a cover plate 722, a bottom plate 723 and a joint member 724. Each container 72 is formed into a stacked structure in which the cover plate 722 of one side of the container 72 is in abutment with the bottom plate 723 of the other side of the container 72. Further, the cover plate 722 and the bottom plate 723 of the container 72 are both formed into a flat plate shape.

The shroud tube 721 of the container 72 is made of austenitic stainless steel and has a thickness of about 0.2 mm and an axial length of about 1 m per one shroud tube 721.

The cover plate 722 and the bottom plate 723 of the container 72 are joined with the shroud tube 721 at the joint portion 724 so as to enclose upper and lower openings of the shroud tube 721. As a joining method, a resistance welding such as a spot welding and a laser welding which has less thermal effects and thermal deformation may be used. A clearance is formed in the joint portion 724 so that the container 72 does not constitute a tightly closed structure.

The space 73 is formed, without utilizing any partition structure, by adopting a structure in which the interior of the container 72 is not fully filled with neutron absorbing material 71.

The cladding tube 74 is dimensioned to have a diameter of about 200 mm and a total length of about 8 m suitable for housing the container 72. Then, a clearance 75 of about 0.5 mm is provided on the mating surface between the container 72 and the cladding tube 74 with the container 72 being housed in the cladding tube 74. The cladding tube 74 is made of cold worked austenitic stainless steel or HT-9 in order to suppress a swelling phenomenon due to neutron irradiation. Further, as shown in FIG. 3, an upper chamber 741 is provided in the upper portion of the cladding tube 74, and a support mechanism 76 of the container 72 is provided in the upper chamber 741.

The support mechanism 76 is configured, as shown in FIG. 3, to downwardly press the cover plate 722 of the container 72 in the uppermost layer so as to support a stacked structure of the containers 72 and to permit its displacement in the upward direction in accordance with deformation of the container 72 caused by the thermal expansion or swelling of the container 72 and other factors.

The support mechanism 76 is made of a base 761 attached to the upper end plug 77 of the cladding tube 74, a guide rod 763 attached to the base 761 by a fastener 762, and a guide 764 and a spring 765 which are pressure welded to the cover plate 722 of the container 72.

The neutron shield 7 of the structure mentioned above will attain the following effects.

(1) The neutron shield 7 includes a plurality of containers 72 each of which contains a powdered neutron absorbing material 71 (for example, $B_4C$) and which are stacked in the vertical direction, and a cladding tube 74 which houses the containers 72. Thus, it becomes possible to contain helium gas, which is generated by, for example, the $^{10}B(n, \alpha)^7Li$ reaction inside the container 72, in a fine clearance of the powder-filled region. Since a plurality of independent containers 72 are stacked with one another, the neutron shield 7 is excellent in the mechanical stability of the containers 72, thus also being excellent in the structural soundness of the neutron absorber (neutron absorbing material) for the neutron shield disposed outside the reactor core.

On the other hand, the filling density of the neutron absorbing material 71 in the container 72 is set to a predetermined value based on the design specification. Therefore, in the case of manufacturing the neutron shield 7 by vibration-compacting the neutron absorbing material 71 into the container 72 having a length similar to that of the cladding tube 74, it takes a very long time to obtain a uniform filling density in the vertical direction.

Further, the neutron shield 7 is intended to be used for a long period of time without scheduled repair and replacement during the operational life of the nuclear reactor 20, there may be a decline in the balance of specific gravity due to nuclear reaction products and a change in filling density due to gravitational effects after being used for a long period of time. The neutron shield 7 of the nuclear reactor 20 has a structure in which the neutron absorbing material 71 is contained in a plurality of independent containers 72 which are stacked with one another. For this reason, it becomes easy to manufacture the neutron shield 7 which can effectively prevent a degradation of the uniform distribution of the neutron absorbing material 71 in the interior of the container 72. Furthermore, it also becomes easy to manufacture a neutron shield 7 which varies the filling density in the vertical direction.

In addition, different from a pellet-type neutron absorbing material 71, a baking process may be eliminated in the manufacturing of neutron absorber, thereby reducing the manufacturing cost.

(2) The container 72 contains the powdered neutron absorbing material 71 with a space 73 left in the upper portion therein. As a result, any deformation due to expansion and contraction of the container 72, which may be caused by heat dispersion and swelling of the neutron absorbing material 71 due to the neutron irradiation, can be absorbed, thereby further enhancing the effect (1) mentioned above.

(3) The clearance 75 of about 0.5 mm is formed in the mating surface between the container 72 and the cladding tube 74, for example, with the container 72 being housed in the cladding tube 74. As a result, even if the deformation due to the expansion or contraction takes place in the container 72, it becomes difficult for a load to be applied to the cladding tube 74, thus also enhancing the effect (1) mentioned above.

(4) The container 72 is configured so as not to tightly enclose the filling region of the neutron absorbing material 71. Therefore, helium gas generated by the $^{10}B(n,\alpha)^7Li$ reaction inside the container 72 will escape to the outside of the cladding tube 721, thereby alleviating the rising of the internal pressure of the container 72. As a result, the effect (1) mentioned above can be further enhanced.

(5) The neutron shield 7 includes an upper chamber 741 which is disposed in the upper portion in the cladding 74 and to which helium gas etc. generated by the $^{10}B(n,\alpha)^7Li$ reaction and leaking to the outside of the container 72 is guided, and also includes a support mechanism 76 which is provided in the upper chamber 741 and which supports the containers 72 by pressing the uppermost container 72 in the stacking direction of the containers and permits deformation caused by thermal expansion or swelling of the container 72 or other factors.

That is, by utilizing the upper chamber 741, which is the installation space for the support mechanism 76 to prevent the vibration of the container 72, the helium gas having escaped from the inside to the outside of the container 72 through the joint part 724 can be guided and reserved. Accordingly, by appropriately setting the volume of the upper chamber 741, it becomes possible to alleviate the rising of the internal pressure of the cladding tube 74 while maintaining the enclosure of the helium gas etc.

Second Embodiment

Figure 4:
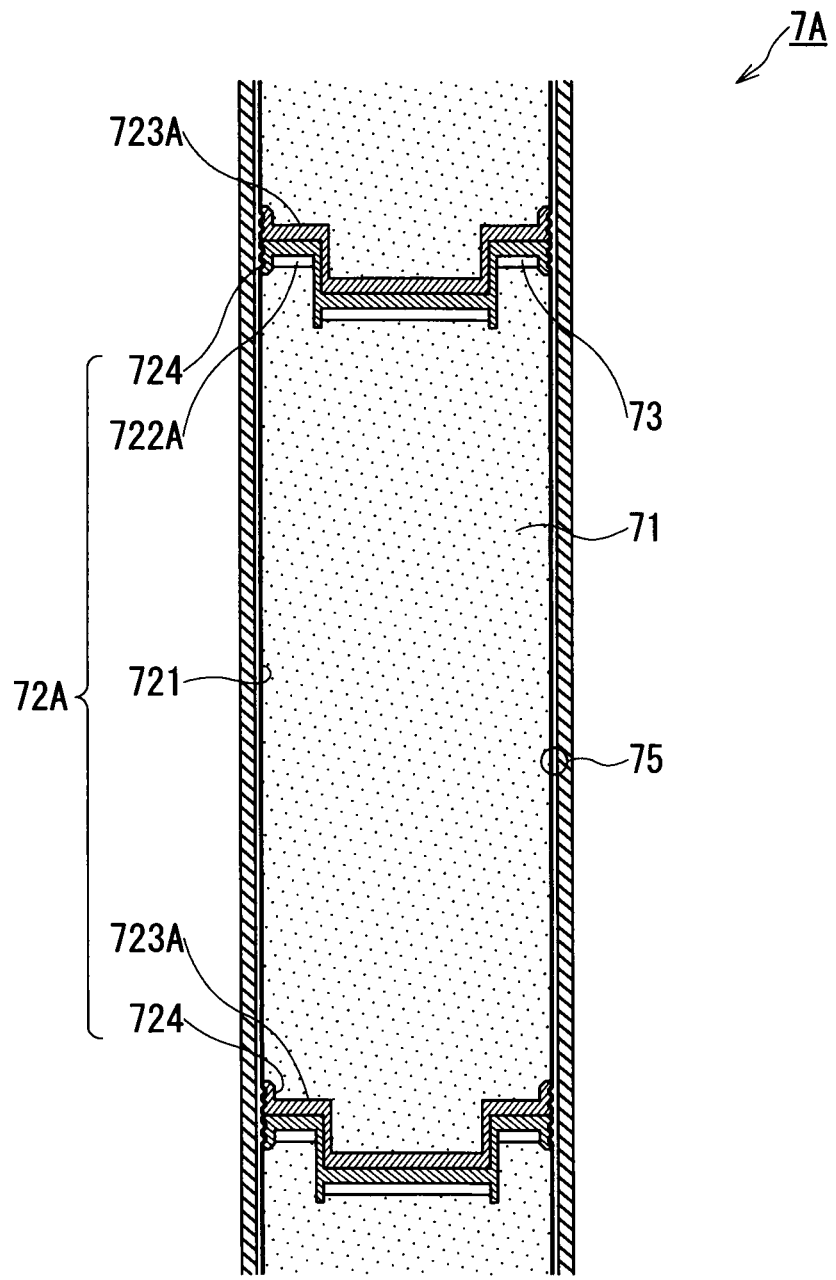
FIG. 4 shows a second embodiment of the neutron shield relating to the present invention.

FIG. 4 shows a second embodiment of the neutron shield relating to the present invention. The second embodiment is an example in which the configurations of the cover plate 722 and the bottom plate 723 are modified in the container 72 of the first embodiment. It is noted that the similar configurations to those of the first embodiment are given like reference symbols will be described by attaching "A" at the end of the reference symbol, and the duplicated descriptions will be simplified or omitted herein.

The neutron shield 7A includes a container 72A as shown in FIG. 4. The container 72A includes a cover plate 722A and a bottom plate 723A.

The cover plate 722A of the container 72A includes a depressed portion which is partly recessed so as to be buried in the neutron absorbing material 71 contained in the container 72A so as to provide a downwardly convex shape in section. On the other hand, the bottom plate 723A of the container 72A is configured to have a downwardly convex shape in section so as to fit into the depressed portion of the cover plate 722A.

The neutron shield 7A of this embodiment will perform the following effects in addition to the effects (1) to (5) mentioned above of the first embodiment.

(6) In the neutrons which are generated at the core 25 (see FIG. 1) and move toward the neutron shield 7A, the number of the neutrons passing through the space 73 of the container 72A is decreased, so that the neutron absorbing effect achieving the effect of (2) of the first embodiment can be prevented from lowering.

Third Embodiment

Figure 5:
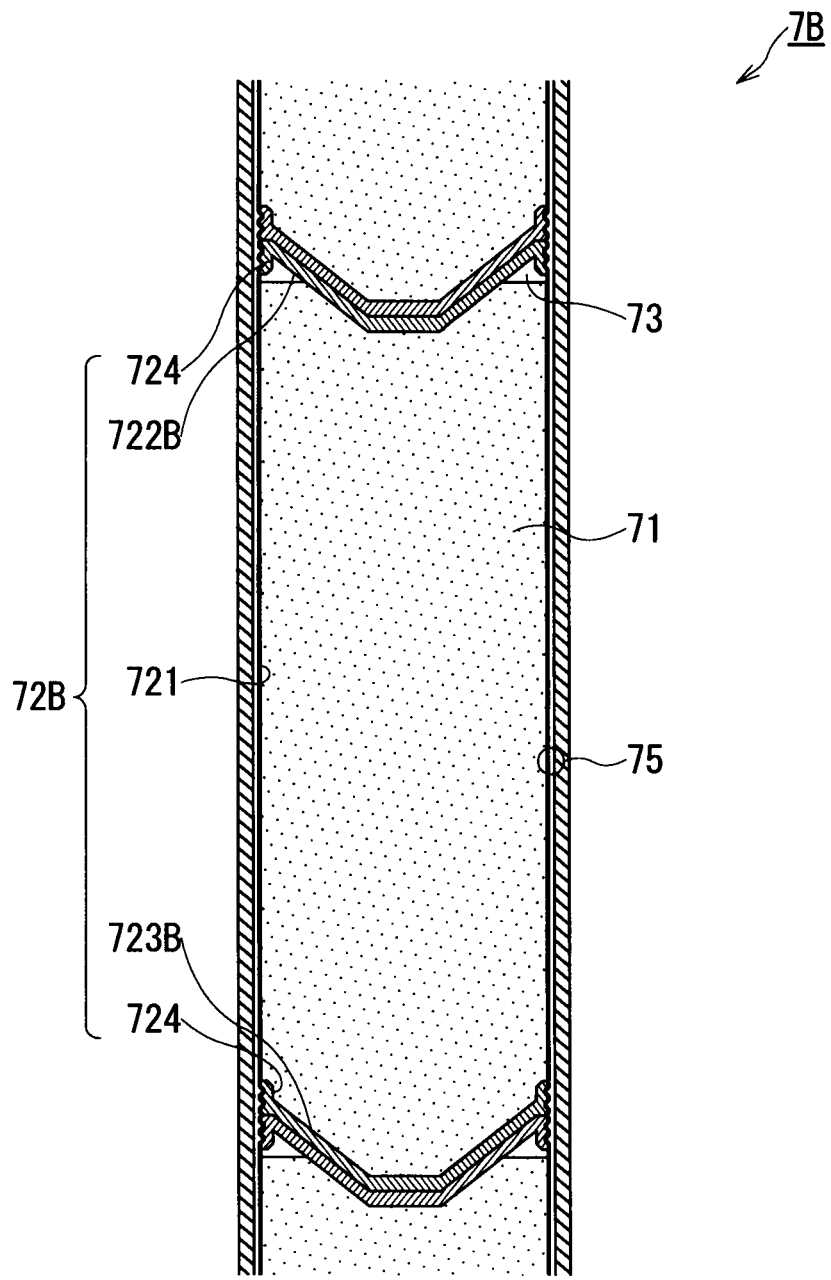
FIG. 5 shows a third embodiment of the neutron shield relating to the present invention.

FIG. 5 shows a third embodiment of the neutron shield relating to the present invention. The third embodiment is an example in which the configurations of the cover plate 722 and the bottom plate 723 are modified in the container 72 of the first embodiment. It is noted that the similar configurations to those of the first embodiment are given like reference symbols will be described by attaching "B" at the end of the reference symbol, and the duplicated descriptions will be simplified or omitted herein.

The neutron shield 7B includes a container 72B as shown in FIG. 4. The container 72B includes a cover plate 722B and a bottom plate 723B.

The cover plate 722B of the container 72B includes a depressed portion which is partly recessed so as to be buried in the neutron absorbing material 71 contained in the container 72B so as to provide a downwardly convex V-shape in section. On the other hand, the bottom plate 723B of the container 72B is configured to have a downwardly convex V-shape in section so as to fit into the depressed portion of the cover plate 722B.

The neutron shield 7B of this embodiment will perform the following effects in addition to the effects (1) to (5) of the first embodiment and the effect (6) of the second embodiment mentioned above.

(7) In forming a V-shaped portion in the cover plate 722B of the container 72B, it is not necessary to use any welding means, and it is also not necessary to perform much machining working amount, resulting in improvement in manufacturability.

It is to be noted that although the neutron shield, the nuclear reactor, and the neutron absorbing method relating to the present invention have been described hereinabove with reference to the first to third embodiments, the present invention is not limited to those embodiments, particularly, in their structures, and many other changes and modifications may be made without departing from the scopes of the present invention defined in the appended claims, for example.

For example, in the first embodiment, although an example of using a powder of $B_4C$ as the neutron absorbing material is shown, it may be possible to use a powder of silver alloy or powder of cadmium compound.

Further, the number of stacks of the container 72 is not specifically limited.

What is claimed is:

1. A neutron shield comprising:
a plurality of containers each of which contains a powdered neutron absorbing material and which are stacked with one another in a vertical direction;
a cladding tube which houses the containers and which is arranged outside a nuclear reactor core;
an upper chamber which is provided at an upper portion of an interior of the cladding tube and into which gas leaked outward from the containers and caused by a neutron absorbing reaction of the powdered neutron absorbing material configured to absorb neutrons leaking from the nuclear reactor core is guided; and
a support mechanism disposed in the upper chamber and configured to support the respective containers by pressing an uppermost container in the stacked containers in the stacking direction so as to permit deformation caused by thermal expansion or swelling,
wherein a clearance is formed between the containers and the cladding tube in a state in which the containers are housed in the cladding tube.

2. The neutron shield according to claim 1, wherein each of the containers contains the powdered neutron absorbing material while keeping a space left in an upper portion of an inside of the container in the stacked state thereof.

3. The neutron shield according to claim 1, wherein the container includes a shroud tube filled with the powdered neutron absorbing material, a cover plate for closing an upper opening of the shroud tube, and a bottom plate for closing a lower opening of the shroud tube so as not to tightly close a neutron absorbing material filling region.

* * * * *